Figure 1:
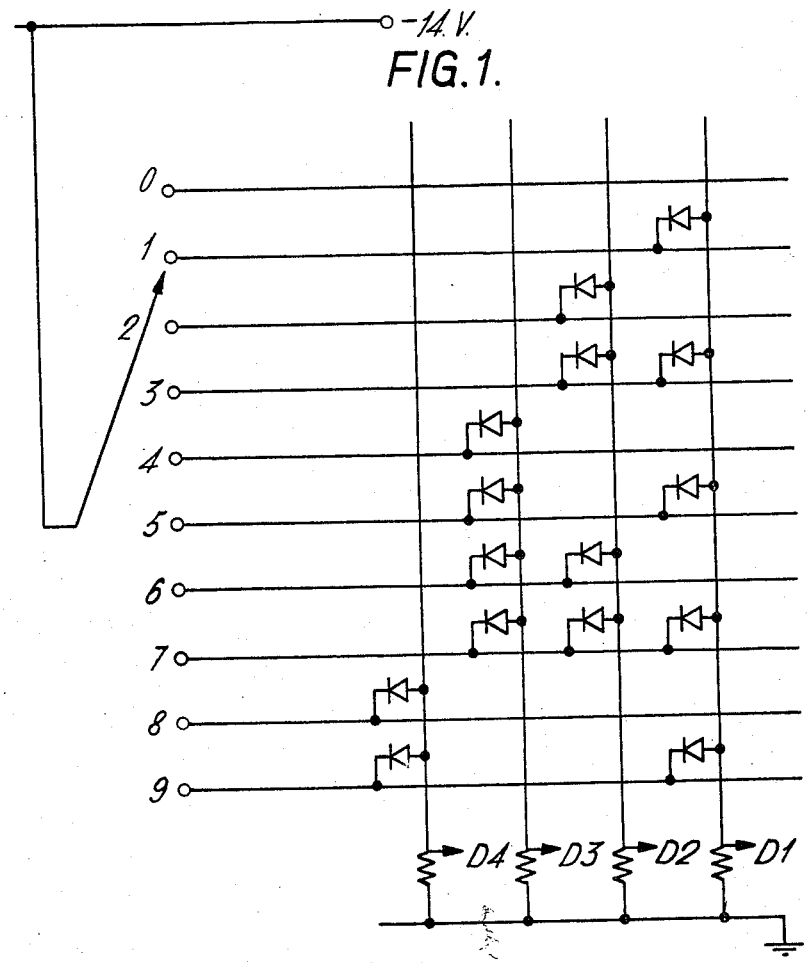

FIG. 2.
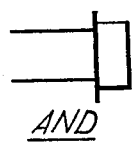
AND
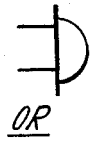
OR
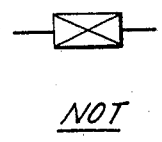
NOT
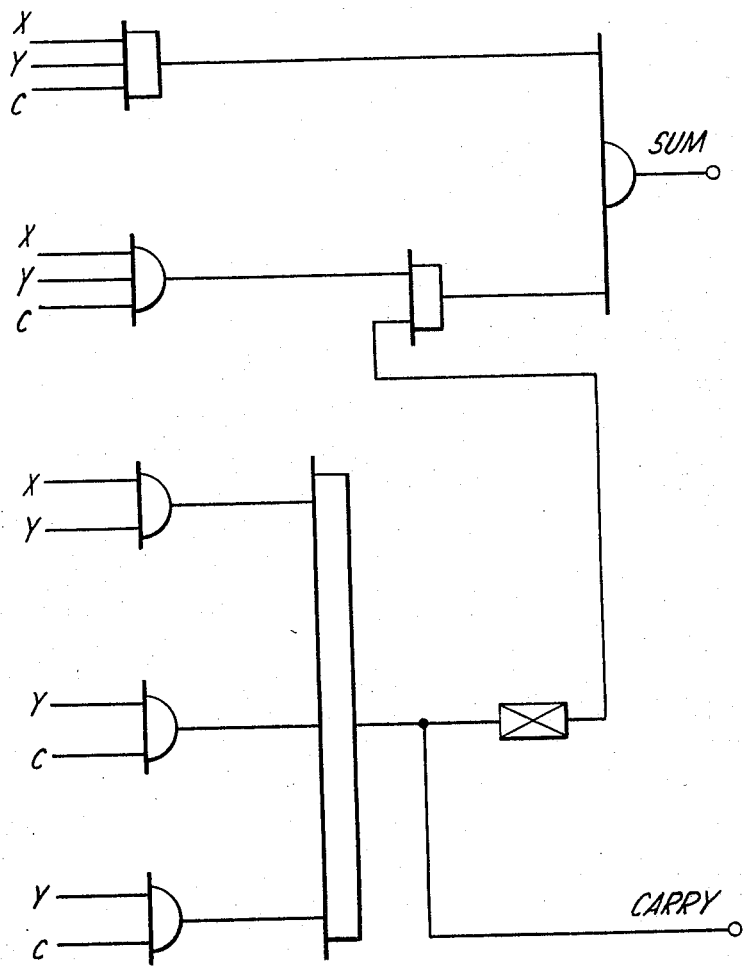

Nov. 15, 1966   W. GREGSON ETAL   3,285,044
SYSTEM FOR THE CONTROL OF THE OPERATION OF INDUSTRIAL MACHINES
Filed April 24, 1961   15 Sheets-Sheet 7
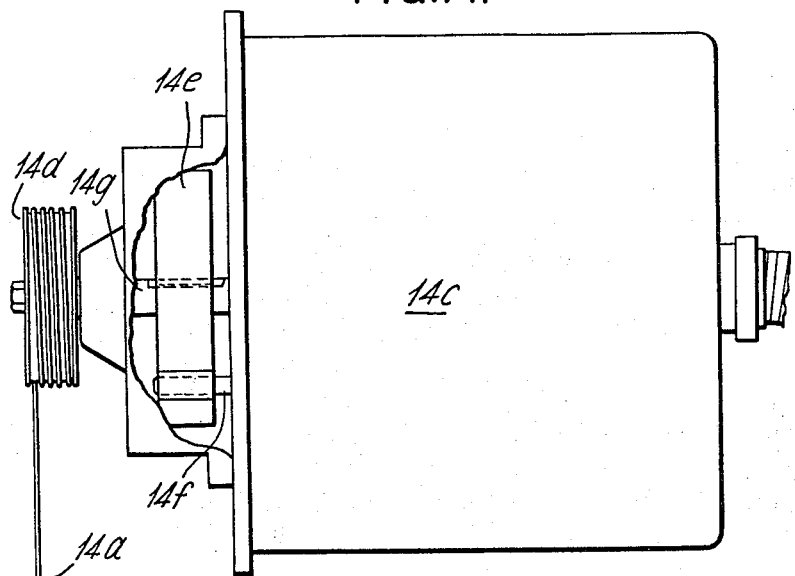
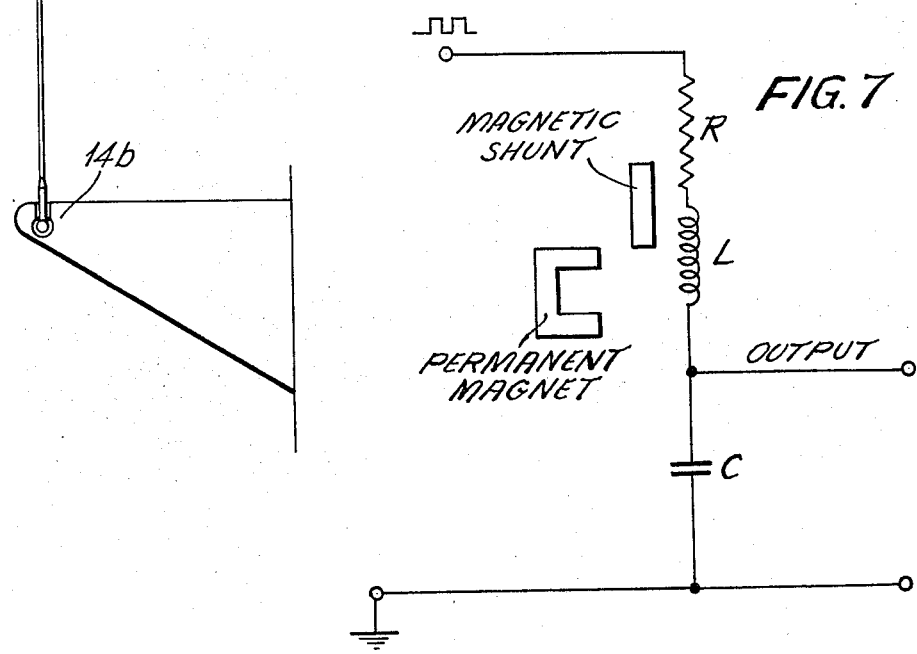

STEEL DISC.

INDUCTOR
MAGNET

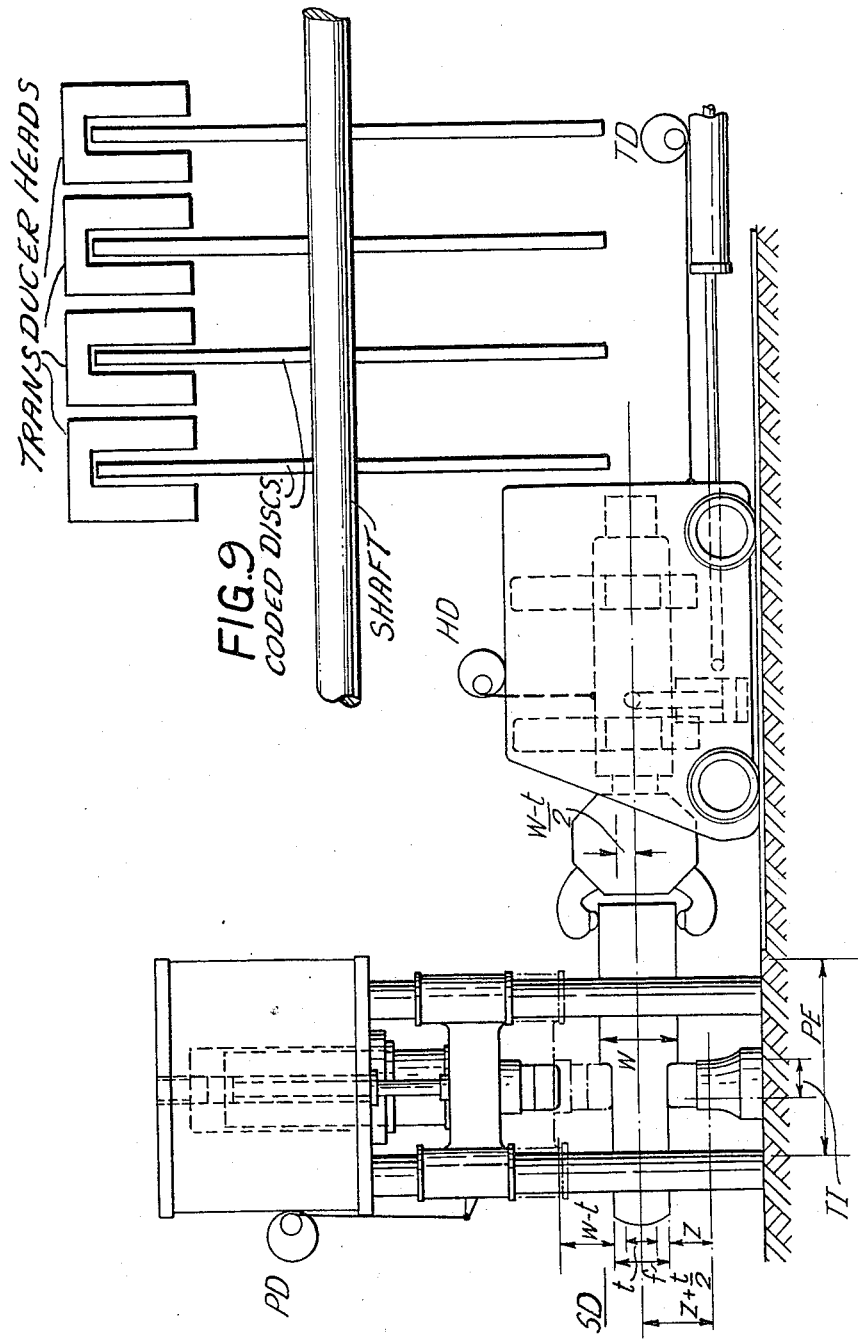

FIG.15.
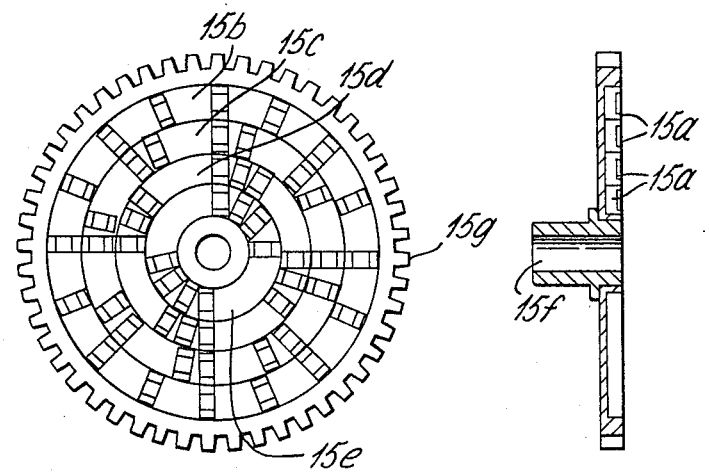
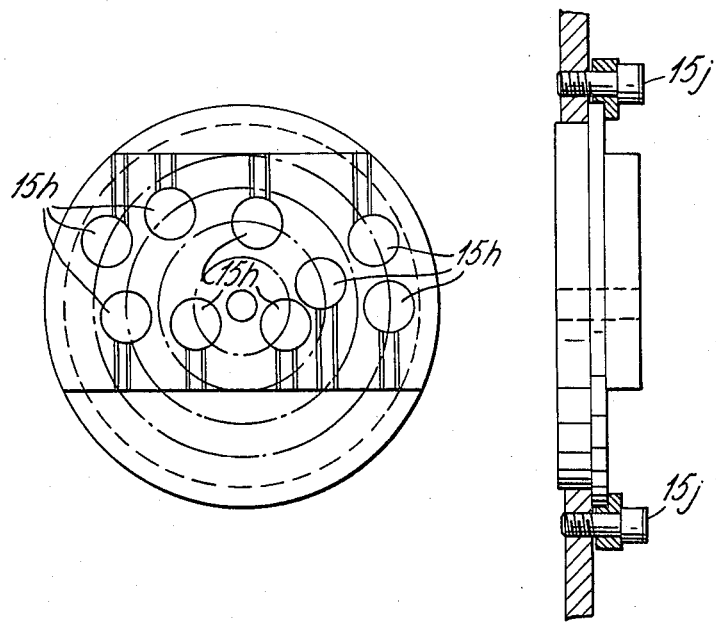

3,285,044
SYSTEM FOR THE CONTROL OF THE OPERATION OF INDUSTRIAL MACHINES

William Gregson, Newton, England, Geoffrey Cooper, Marford, Wales, and Bernard Charles Wilkins, Rodley, near Leeds, England, assignors to Towler Brothers (Patents) Limited, Rodley, England
Filed Apr. 24, 1961, Ser. No. 105,177
18 Claims. (Cl. 72—8)

The invention relates to a system for the control of the operation of industrial machines.

In manufacturing processes, machines are used in which discrete mechanical movements and other machine functions are automatically controlled to produce better or faster results. Such machines include rolling mills and manipulating tables, large planing machines, forging presses and manipulators, large mine hoists, extrusion presses, callenders or the like.

Thus, for example, the economic working of forges depends mainly upon making the best use of the heat in the forging. This in turn implies working the forge plant, presses and manipulators, at the fastest possible rate.

The rate at which such equipment can be worked by human operators even when mechanically aided, is restricted by the speed of human perception and the use of automatic controls capable of operating many times faster than this permits more rapid working of the forging to a finished size of greater accuracy and at the same time with better utilisation of heat.

Though automatic means for controlling the motion of many machines, including forging presses are known, they are not yet capable of the high degree of adjustment and accuracy, nor do they attain the standard of robustness and reliability, that such applications require. It is moreover impossible or impracticable to coordinate existing control means to provide a comprehensive control of several related machines such as for example, a forging press, a manipulator and cranes or readily to cause them to work in accordance with a prearranged cycle of programme.

It is among the objects of the invention to provide an improved control system which makes good these deficiencies.

With the object of accuracy and to facilitate programming, the improved control system operates on a digital basis. This means that the control system responds, not to continuously varying quantities but to signals representing discrete numbers of any requisite accuracy and in turn controlling the operation of the machine and the component to the same degree of accuracy.

With the object of reliability and speed of operation, the proposed system of control makes use where necessary of control elements such as rapid acting relays and switches in which physical operation of contacts is eliminated. Additionally, units or groups of units may be duplicated and give warning signals if either unit or group of responding differently from its partners.

It is also an object to support the accuracy of the aforementioned control elements by means of high speed electrically actuated hydraulic valves to ensure that the hydraulic elements which the system controls can be operated with minimum delay and attendant error.

The invention consists of control means comprising digital reference elements, robust rapid reading digital measuring devices, and logic circuits making use of solid state electrical elements, that is not involving physically contacting parts, and rapid acting large flow electro-hydraulic valve members and elements thereof, which in combination control machine movements or other functions and give warning to or initiate action to prevent malfunctioning of the control means or of the controlled machine.

The digital measuring devices are of a type specifically intended to withstand, without attendant damage, the rapid accelerations and retardations present in industrial machines, and for easy and convenient drive when measuring linear displacements.

Figure 3:
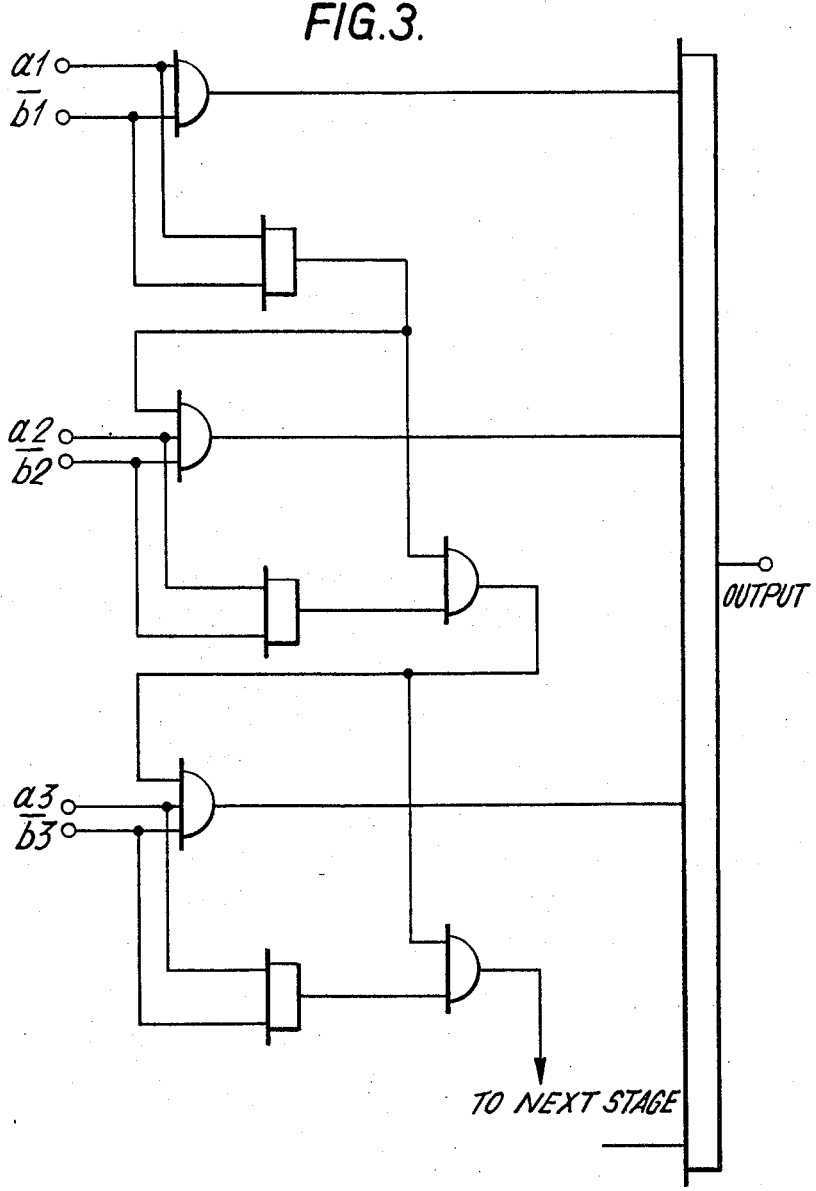
Figure 4:
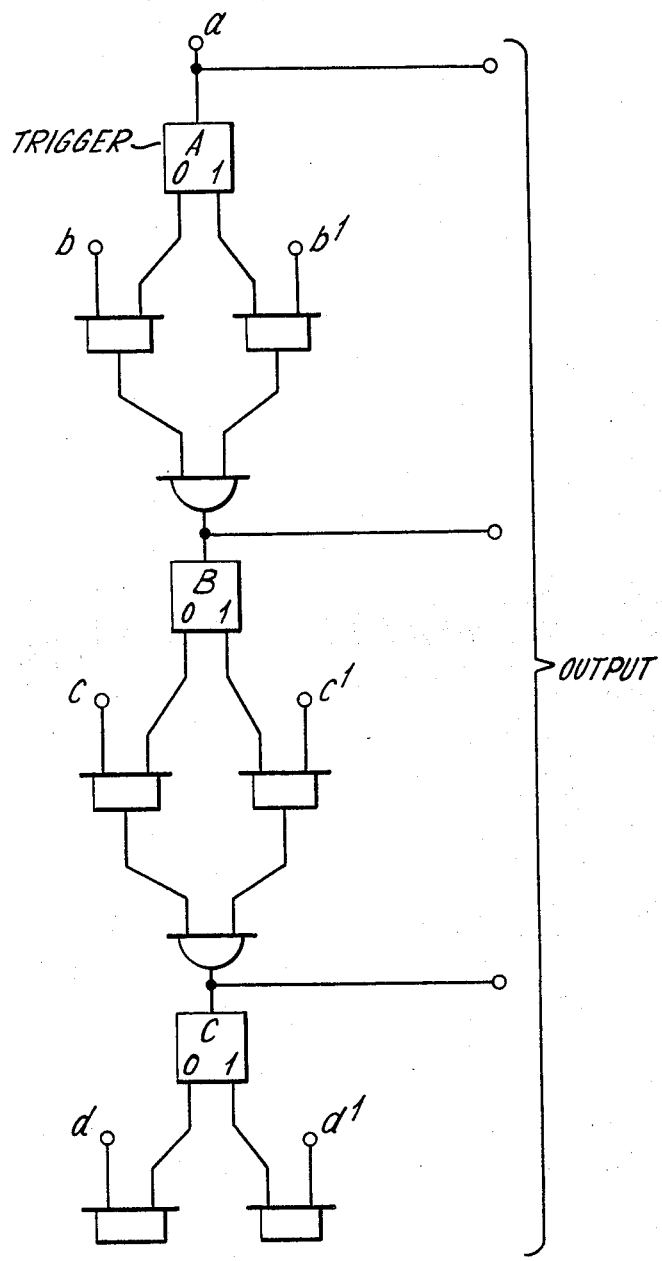
Figure 5:
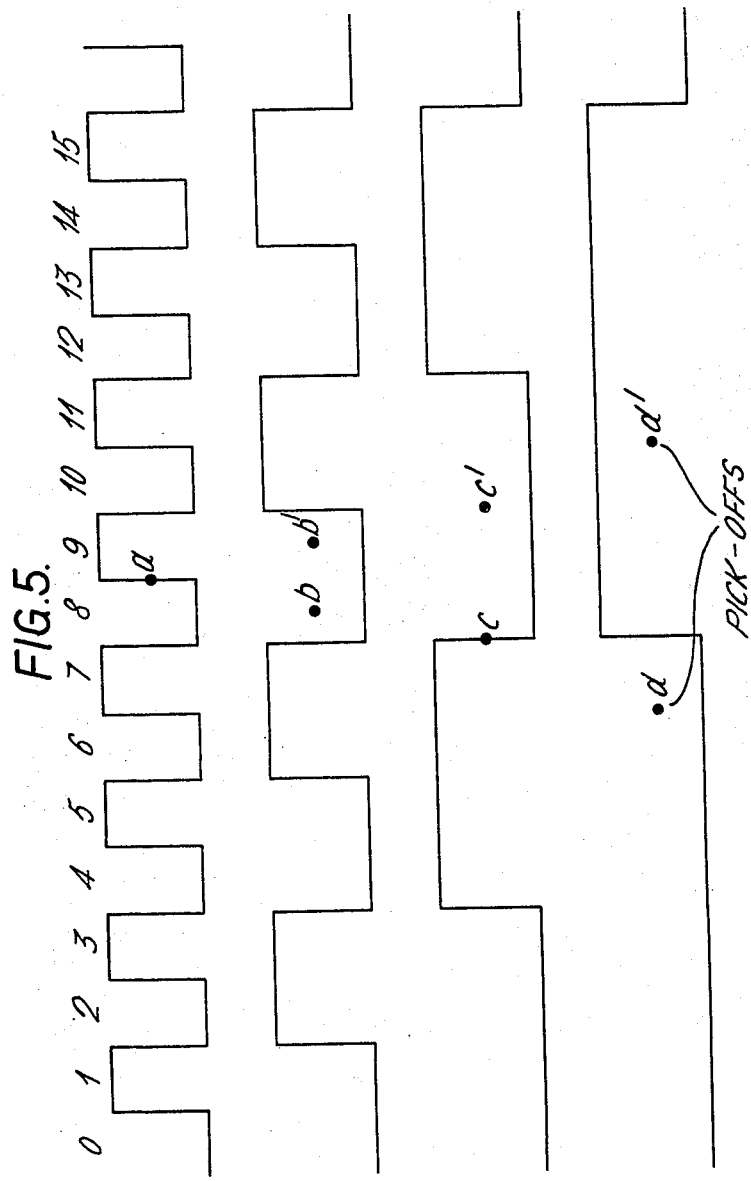
Figure 6:
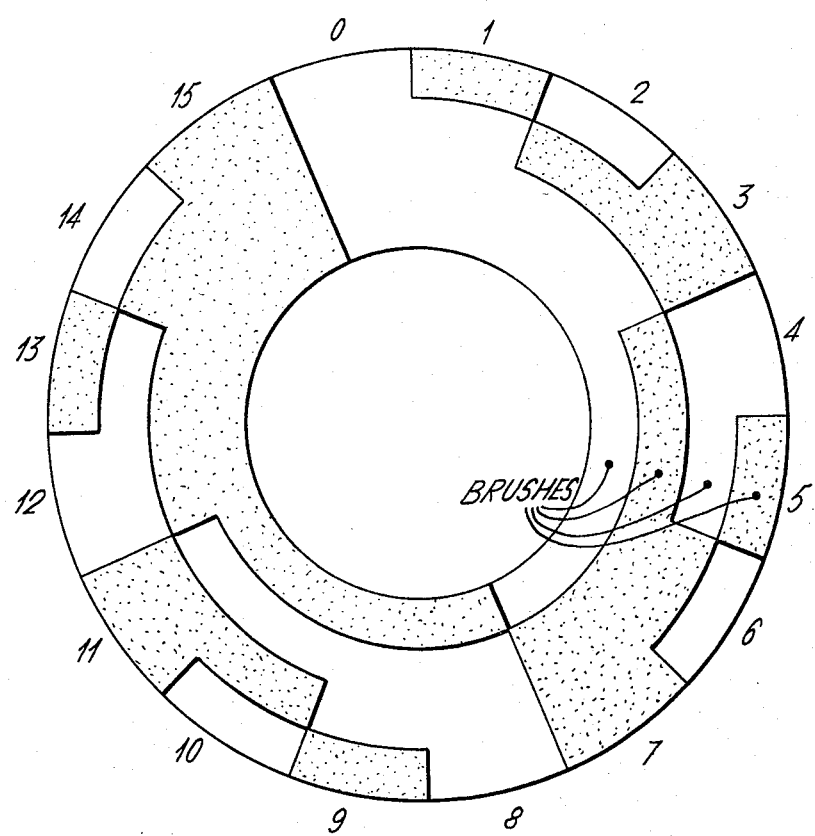
Figure 8A:
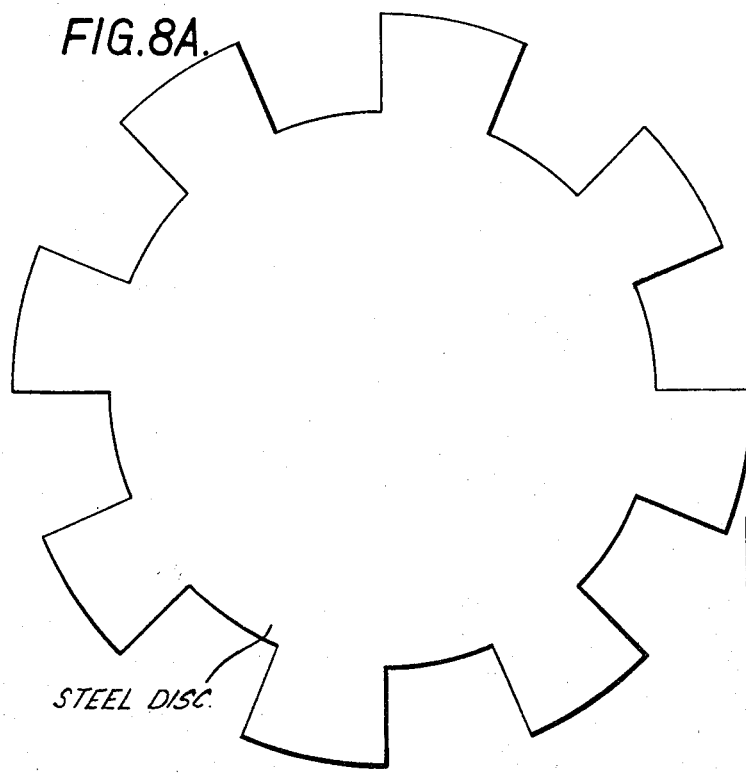
Figure 8C:
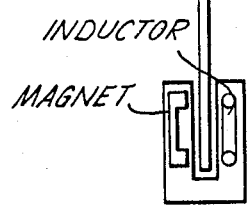
Figure 8B:
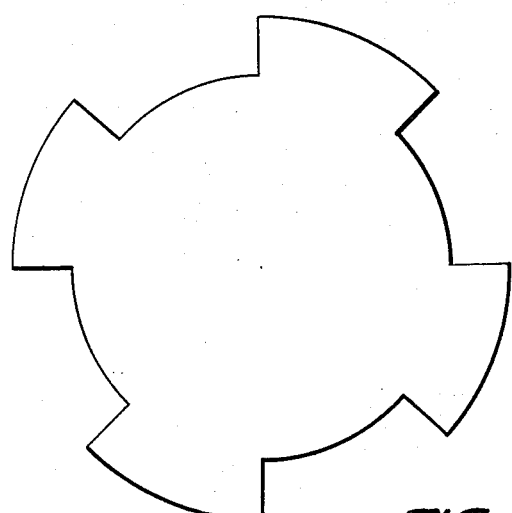
Figure 10:
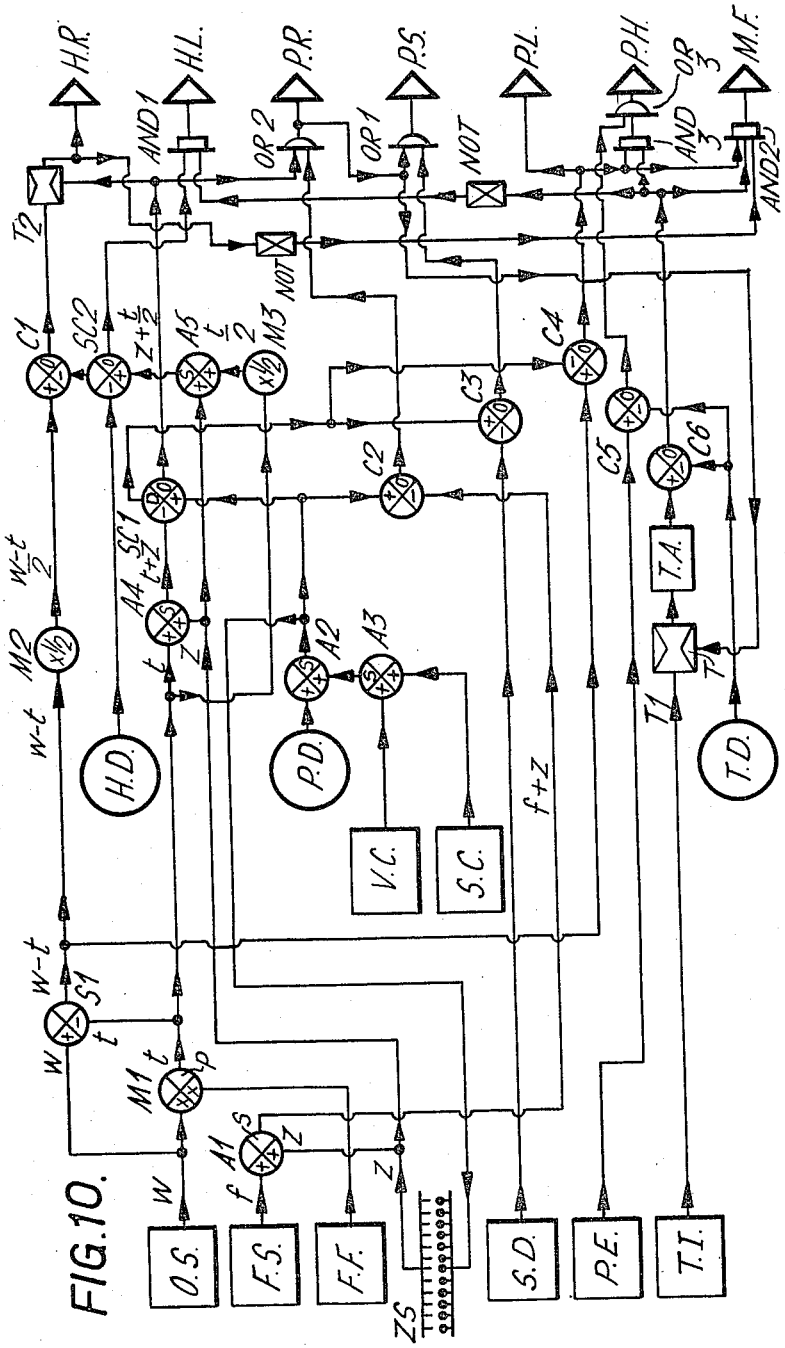
Figure 11:
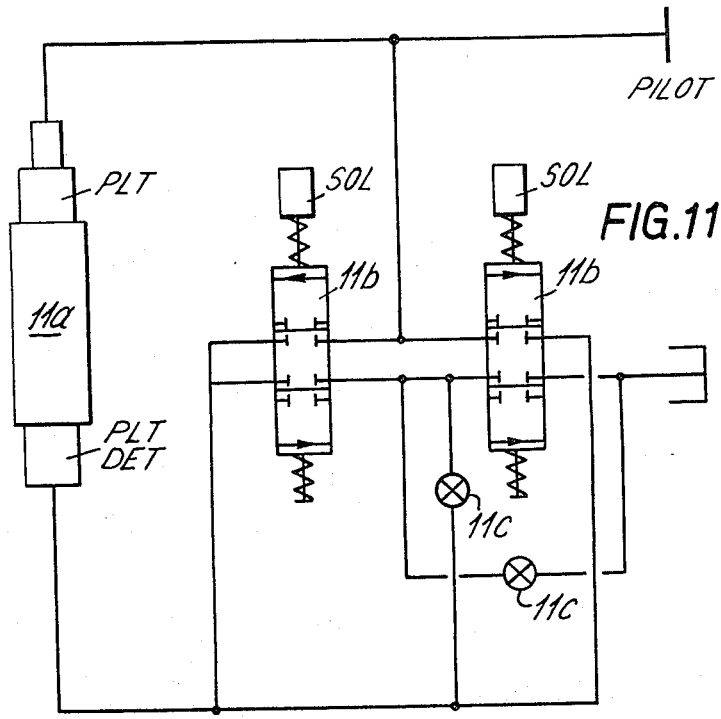
Figure 12:
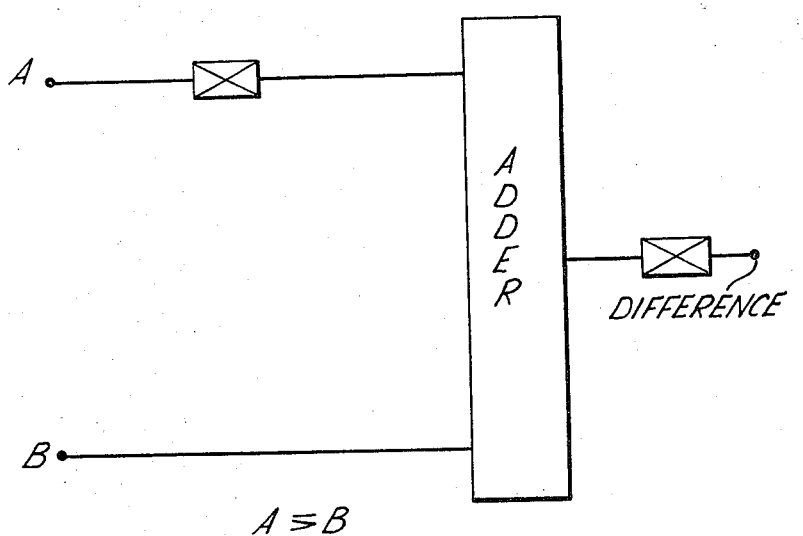
Figure 13:
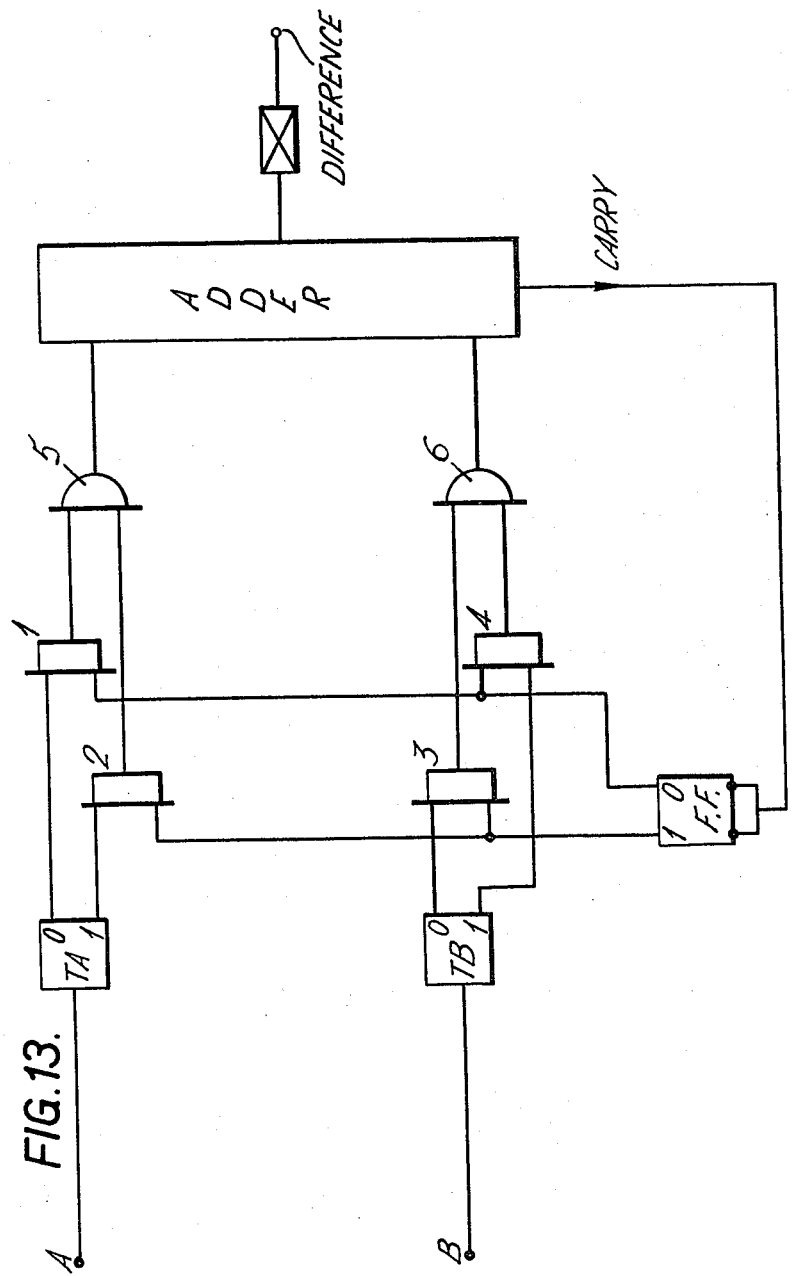
Figure 16:
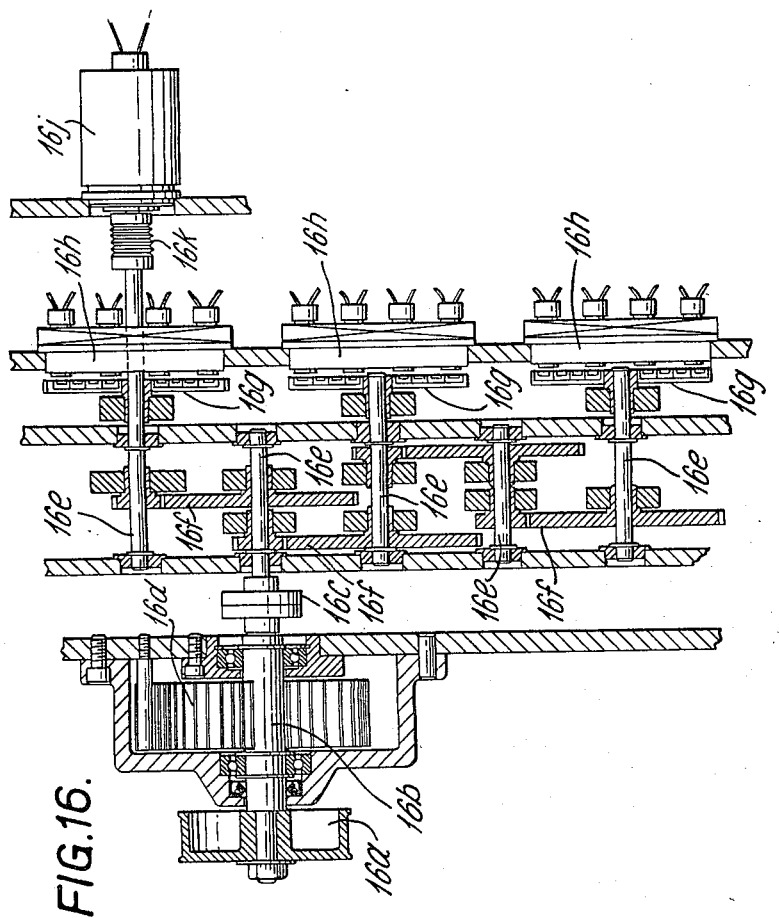
Figure 17:
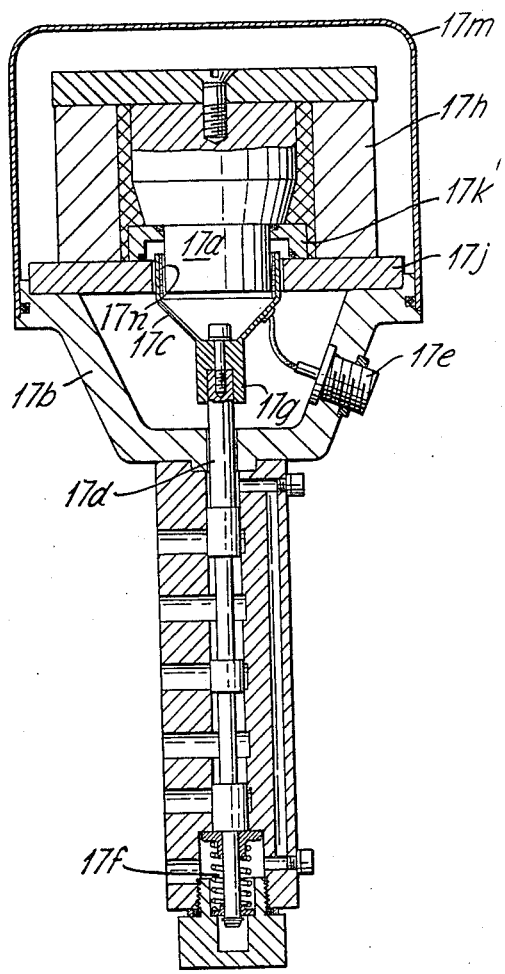

The application of the invention to the control of movements of a forging press and manipulator is illustrated by means of example, with reference to the accompanying drawings, in which:

FIGURE 1 shows a diode matrix for converting decimal digits to binary form;
FIGURE 2 shows logical circuits used for adding digits in binary form;
FIGURE 3 shows a circuit for comparing two numbers in binary form so that an output signal results when one number equals or exceeds the other;
FIGURE 4 shows a circuit for converting analogue information to digital form;
FIGURE 5 is a schematic drawing to assist the understanding of FIGURE 4;
FIGURE 6 shows a known type of disc used for converting analogue information to digital form;
FIGURE 7 shows a circuit in which according to the presence or absence of a magnetic shunt a low or high potential is produced across a pair of output terminals;
FIGURE 8a shows a front view of a disc used as a magnetic shunt in the circuit of FIGURE 7;
FIGURE 8b shows a front view of a disc, similar to that in FIGURE 8a, in reduced scale;
FIGURE 8c shows a side view of a disc, such as that shown in FIGURE 8a or 8b, together with an associated magnet and inductor;
FIGURE 9 shows an array of discs, similar to those shown in FIGURES 8a and 8b, on a common shaft;
FIGURE 10 shows a block diagram of the control circuit for a forging operation;
FIGURE 11 illustrates the method of applying the outputs from the control circuits to the hydraulic valves;
FIGURES 12 and 13 show logic circuits for finding the difference between two numbers in binary form;
FIGURE 14 shows a general view of the digitizer;
FIGURE 15 shows a detail of the disc and pick-off mounting;
FIGURE 16 shows a sectional layout of the digitizer;
FIGURE 17 shows the rapid acting large flow valve;
FIGURE 18 shows a view of a forging press and manipulator.

In a modern hydraulic forging press, illustrated in FIGURE 18, the ingot rests upon a lower fixed tool whilst an upper moving tool is reciprocated between two predetermined positions, the lower determined by the required thickness of the forging and the upper removed sufficiently from the lower to permit the undeformed part of the ingot to be fed into the press. It may be necessary for the upper tool to dwell at the upper position for a time sufficient to permit manipulation of the ingot before starting the approach and pressing stroke. It is desirable for the tool to be returned from the lower position with the minimum delay. This reciprocatory motion is controlled inter alia by a directional valve which in one position permits the moving parts of the press to descend and in the other position relieves the pressure in the working cylinder, admits pressure to the return cylinders and permits the moving parts to return. Between each forging stroke the ingot must be moved to a new position by the forging manipulator or cranes.

The basic cycle of operation can therefore be defined as:

(a) Approach and forging stroke (Press Lower).

(b) Stop at predetermined lower position, decompress, and return to a predetermined upper position (Press Raise).
(c) Press stands still (Press Holds).
(d) Manipulator lifts ingot (Hoist Raise).
(e) Manipulator moves ingot to new position (Manipulator Travels).
(f) Manipulator replaces ingot on tool (Hoist Lower).

In some cases it may be desirable to reduce the speed of approach as the final position of the upper tool is neared (Press Slows), and the manipulator may also rotate the forging. To exercise this control it is broadly proposed to preset the required positions, speeds and dwells upon input elements, if necessary, to convert this information to a signal of digital form which can be compared with a digital signal, i.e. a number indicating to any desired order of accuracy the position of the press load or of elements of the manipulator. In addition the system is also designed for programming by automatic means such as a computer whereby the necessary input information is derived from the shape and condition of the forging so as to optimise the rate of forging or the quality of the forged product.

The input information is sometimes conveniently set up in decimal or fractional form. This is particularly so when the information is set up by an operator who thinks in terms of a number system based on the root 10 rather than the root 2. On the other hand, it is more convenient for an automatic control system to handle numbers based on the root 2, that is in binary form for with two digits only to be distinguished the possibility of error is slight. It is necessary, therefore, to convert decimal fractional inputs to binary form.

This conversion from decimal to binary form can be achieved in known manner by means of a diode matrix, one type, a converter of 10″, 1″ and 1/32″ being shown in FIGURE 1. The 1″ matrix is identical to the one shown in FIGURE 1 but the 10″ matrix is slightly different since 10 in binary form is 0001010 and 20 is 0010100. The outputs from these two matrices must be added together and constitute the first 7 most significant digits. The last 5 digits are derived from the third matrix and give the fractions of an inch from 1/32″ to 31/32″ giving a binary number of 1/32″ units.

Thus for example, let the switches be set to give 57″

50 = 011001000000 units of 1/32″
7 = 000011100000 units of 1/32″

57 = 011100100000 units of 1/32″

If 57.7/32″ were required then the addition would be:

57 = 011100100000 units of 1/32″
7/32 = 000000000111 units of 1/32″

57.7/32 = 011100100111 units of 1/32″

Since the last 5 digits of the tens and units are always zeros and the first 7 digits of the 1/32 are also zeros, the two may be combined without the use of an adder.

In a control system of this type however it is necessary for digital quantities to be added together. This can be done in known manner as follows:

The rules for a full binary adder are:

| X | Y | C | Sum | Carry |
|---|---|---|-----|-------|
| 0 | 0 | 0 | 0 | 0 |
| 0 | 0 | 1 | 1 | 0 |
| 0 | 1 | 0 | 1 | 0 |
| 1 | 0 | 0 | 1 | 0 |
| 0 | 1 | 1 | 0 | 1 |
| 1 | 1 | 0 | 0 | 1 |
| 1 | 0 | 1 | 0 | 1 |
| 1 | 1 | 1 | 1 | 1 | where X Y are the two digits being added and C is the carry digit from the previous stage.

Inspection of the above table shows that its symbolic logical (Boolean) expression is:

$$\text{Sum} = (X+Y+C)(\overline{XC}+\overline{YC}+\overline{XY})+XYC$$
$$\text{Carry} = YC+XY+XC$$

Where XC is read as X AND C, X+C is read as X OR C, and $\overline{X}$ is read as NOT X.

The above equations can be modified to give the following expressions:

$$\text{Sum} = (X+Y+C)(\overline{X}+\overline{C})(\overline{X}+\overline{Y})(\overline{X}+\overline{C})+XYC$$
$$\text{Carry} = (Y+C)(X+Y)(X+C)$$

and the logic diagram of this is shown in FIGURE 2. This figure also shows the basic logical units which are used. These comprise the AND, the OR and the NOT. The AND functions such that if input signals are present on all of its input terminals an output signal will appear. The OR functions such that if there is a signal on any of its input terminals an output signal will appear and the NOT functions such that if there is a signal at its input terminal no signal appears on the output and vice versa.

In this control system it is also to compare two quantities so that a signal may be derived when one quantity equals or exceeds the other.

This unit is used to compare two binary numbers A and B and produce an output when they are of equal value. It will also continue to give an output if the one digital number A is greater than the other B. The conditions governing this are given in FIGURE 3.

As an example let $A=28$ and $B=14$, $\overline{B}$ being the binary complement of B, then:

$A = 011100$, $B = 001110$ and its binary complement $\overline{B} = 110001$

By inspection it can be seen that the first two digits (from the left hand side) will energise the first "leg" of the main AND circuit. The second pair of digits will do likewise, and since $a_2=1$ and $b_2=1$, the AND fed directly by these digits will be "set up" and the output propagated through the system. Hence regardless of what vlaue the remaining digits have, all the inputs to the main AND will be energised and an output will result.

Now let $A=28$ and $B=35$:

$A = 011100$, $B = 100011$ and its binary complement $\overline{B} = 011100$

In this case the first pair of digits are zero and hence the first leg of the main AND is not energised and the output will be zero.

The difference between two binary numbers can be obtained by taking the binary complement of the larger number, adding it to the smaller number and then taking the binary complement of this addition. As is well known in the art, a binary number is changed into its binary complement by changing each 1 to a 0 and vice versa. As an example subtract 5 from 8:

8 = 1000
5 = 0101

Now the binary complement of 8 is 0111, therefore:

$\overline{8}$ = 0111
5 = 0101 adding    1100

Complement = 0011 = 3 the required difference.

The basic logic circuit for performing the above operation is shown in FIGURE 12. This circuit is adequate provided A is greater than B, but in the application being considered this is not always true.

Thus, consider the operation of FIGURE 12 when A is less than B
If $A=6=0110$ and $B=10=1010$ therefore:

$$\bar{A}=1001$$
$$B=1010$$
$$\text{adding } \overline{10011}$$

Complement $01100=12$ which is not the required answer.

It will be observed that during the addition a carry is generated by the most significant digits. This carry is therefore an indication that B is greater than A.

In order to multiply a digital number by another digital number representing a fraction the following method may be used:

| | 4″ | 2″ | 1″ | ½″ | ¼″ | ⅛″ | 1/16″ | 1/32″ |
|---|---|---|---|---|---|---|---|---|
| Multiplicand | A8 | A7 | A6 | A5 | A4 | A3 | A2 | A1 |
| Multiplier | | | | X5 | X4 | X3 | X2 | X1 |

Static multiplication is carried out by using 2 input ANDs to form the partial products which are then summed by Adders. The highest fractional digit of the multiplier is used first and the partial product obtained is shifted one digit to the right. The next highest fractional digit (i.e. ¼″) is then used and this partial product is also shifted one digit to the right, relative to the previous result. This action continues for all digits in the multiplier as shown below:

| 4″ | 2″ | 1″ | ½″ | ¼″ | ⅛″ | 1/16″ | 1/32″ |
|---|---|---|---|---|---|---|---|
| A8 | A7 | A6 | A5 X5 | A4 X4 | A3 X3 | A2 X2 | A1 X1 |
| | A8X5 | A7X5 A8X4 | A6X5 A7X4 A8X3 | A5X5 A6X4 A7X3 A8X2 | A4X5 A5X4 A6X3 A7X2 A8X1 | A3X5 A4X4 A5X3 A6X2 A7X1 | A2X5 A3X4 A4X3 A5X2 A6X1 |

The above is formed by taking each pair of digits into a 2 input AND the outputs of which are summed up in Adders.

As an example consider the following 13¼ × ⅜:

| 8″ | 4″ | 2″ | 1″ | ½″ | ¼″ | ⅛″ | 1/16″ | 1/32″ | |
|---|---|---|---|---|---|---|---|---|---|
| 1 | 1 | 0 | 1 | 0 | 1 | 0 | 0 | 0 | =13¼ |
| | | | | 0 | 0 | 1 | 1 | 0 | 0 | =⅜ |
| | 0 | 0 | 0 | 0 | 0 | 0 | 0 | 0 | |
| | | 1 | 1 | 1 | 1 | 0 | 1 | 0 | |
| | | | | 1 | 0 | 0 | 0 | 1 | |
| | | | | | 0 | 0 | 0 | 0 | |
| | | | | | | 0 | 0 | 0 | |
| | 1 | 0 | 0 | 1 | 1 | 1 | 1 | 1 | =43 1/32 |

The accuracy of the above method can be increased by using more digits in the multiplier, i.e. 1/64″ and 1/128″ digits. The partial products generated by these digits are only used when they fall within the range of 8″ to 1/32″.

With systems of digital type, information is derived concerning continuously varying quantities. This derivation requires a mechanism known as a digitizer, which converts continuously varying, or as it is often called, analogue information to digital form.

When a pure binary code is used on the digitizer, it is possible to obtain ambiguous information. The reason for this is that several digits may change at the same instant but due to mechanical tolerance it is not possible to achieve this in practice. There are two methods by which the above ambiguities may be eliminated. One is to use a reflected code such as the Grey Code in which only one digit changes between successive numbers, and the other is to use the pure binary code and and duplicate the pickoffs. The latter are then selected by means of external circuits such as is shown in FIGURE 4. It is difficult to perform arithmetical operations on reflected codes and this is their main disadvantage. It is proposed therefore that the dual pickoff or V type selection should be used.

In FIGURE 4 circuits A, B and C are flip-flops or triggers which apply signals of different potentials to their left- and right-hand outputs. In the normal or 0 condition outputs representing 0 and 1 are applied to the left- and right-hand outputs respectively. In the set or 1 condition the outputs are reversed.

The operation of this method can be understood by referring to FIGURES 4 and 5.

Let the pickoffs $a$, $b$, $c$, $d$ and $b'$, $c'$, $d'$ be in the position shown in FIGURE 5. When a pickoff is vertically in line with the upper part of a square wave, it reads 1. When a pickoff is vertically in line with the lower part of a square wave, it reads 0.

It will be observed that the digits read by pickoffs $a$ and $c$ are uncertain since they are at the transitional stage between 0 and 1.

However, when the outputs are fed into the selector circuit shown in FIGURE 4 the digit read becomes unambiguous.

Thus if pickoff $a$ is on segment 8 the input trigger A is in normal or zero condition at zero and the two outputs are as shown, thus setting up the $b'$ AND circuit, i.e., the AND circuit with $b'$ as one of its inputs.

Now pickoff $b'$ is at zero and therefore trigger B is also in zero condition and the two outputs of trigger B are as shown. Hence the $c'$ AND circuit is selected instead of the ambiguous $c$. Pickoff $c'$ is also at zero where trigger C is in zero condition as shown and hence the $d'$ AND gate is selected. Pickoff $d'$ is at 1. The output is therefore 1000 which is binary 8. If there is a slight movement so that pickoff $a$ is now in segment 9, the input trigger A will be changed over to set or 1 condition. The AND circuit associated with pickoff $b$ will now be selected and as this is zero, trigger B remains at 0 and the remaining trigger, AND circuits and pickoffs will be selected as before. The output is now 1001 which is binary 9.

It should be noted that pickoff $a$ represents the lowest binary denomination, with one or the other of each of the pairs $b$ and $b'$, $c$ and $c'$ and $d$ and $d'$ representing successively higher binary denominations.

The control system of the invention comprises a method of converting analogue information concerning the position of a machine element to digital form.

At the present stage of the art, this is generally achieved by the use of (a) contact devices or (b) photocells. Method (a) consists of a circular disc driven by the machine element whose position is to be indicated by a digital number. On the disc are a number of conducting and nonconducting segments arranged in concentric tracks as shown in FIGURE 6 for example. Each track has a brush and when a conducting segment is in contact with it an output voltage appears. The outermost track in this example consists of 16 segments or digits and hence 16 unique positions can be identified. As an example, let segment 5 be in lines with the brushes, then the digital number will be 0101 (reading the inner track first). The resolution may be increased by using more tracks, and the innermost track will have $2^1$ digits and the $n^{th}$ track $2^n$ digits. Thus the resolution of the disc is 1 part in $2^n$.

The main disadvantage of this type of digitizer is the fact that contacts are used, and hence the life of a disc may be quite short.

Method (b) is similar in concept to (a) but the disc consists of clear and opaque segments and used in conjunction with a light source and photocells.

The limitations here are again mainly mechanical due to the fragile nature of the light source. Also the frequency response of the photocells used is fairly low and this restricts the speed of the disc.

Some photoelectric digitizers use a high voltage discharge tube as the light source which is so pulsed that the photocell output can be handled by A.C. amplifiers. As the high voltage supply is about 9 kv. its reliability under industrial conditions is doubtful.

The code or arrangement of digits on the disc described above, is known as the pure binary, and whilst it has the merit of simplicity and ease of handling in arithmetic circuits, it has the disadvantage of giving an ambiguous reading as the digits change. This arises from the fact that it is mechanically impossible to arrange the contacts so that all digits change at the same instant.

There are two basic methods for overcoming this disadvantage, and these are (a) by the use of a reflected code such as, for example, the Grey Code, which is characterised by the fact that only one digit changes as the disc is moved to the adjacent position.

The disadvantage here is that it is difficult to perform arithmetical operations using reflected codes.

The alternative method is to use a pure binary code and a switching method. This consists of duplicated brushes an all but the outermost tracks which are arranged in the form of a V. The least significant digit determines which of the two brushes on the next track is used and the selected brush then determines the brush on the next track, and so on. By suitable arrangement of these brushes the ambiguity can be eliminated as hereinbefore described.

The apparatus according to the invention requires neither photocells and light sources nor brushes but utilises a magnet device, the principle of which is shown in FIGURE 7. A resistor R, capacitor C and saturable inductor L are connected as shown and energised from an A.C. supply. The latter generally has a square wave form and a frequency of 10 to 20 kc./s., such as can be obtained from a transistor oscillator. In its normal state the output from the ferroresonant circuit is very small, being governed by the magnetising current of the inductor and the value of C. However, if a permanent or electro magnet is placed in such a position that its flux can influence the inductor L, the current taken by the circuit will increase and hence the voltage across the capacitor C will increase. This voltage will add to the supply voltage in such manner as to cause the inductor to saturate further, causing the current to increase. Hence the action is cumulative and a large output appears across the capacitor C. By suitable choice of components the device will switch off when the influence of the magnet is removed. This may be achieved in several ways and more particularly by the use of a magnetic shunt as shown in FIGURE 7.

Thus the invention provides means of replacing a conventional mechanical switch the application of which to digitizers is as follows:

The inductor L and the magnet are arranged as a single unit in such a manner that the periphery of a thin steel disc can move between them. Sections are removed from the periphery of the disc according to the digital code being used as shown in FIGURE 8A. This disc will then generate the least significant digits. The next set of digits are generated by a similar disc as shown in FIGURE 8B. In order to increase the resolution without increasing the diameter of the disc, groups of discs may be geared together.

Thus a digitizer in this form would have several discs arranged axially on a common shaft as shown in FIGURE 9, but to generate digits a high rate, i.e. of the order of one thousand per second, would need to be of large effective inertia and consequently not easily driven at large rates of acceleration or retardation, i.e. of the order of one million digits per second.

The digitizer according to the present invention makes use of digital discs of high strength low density resin compounds in which are embedded curved magnets in concentric rings making up a digital pattern as previously described.

Alternatively the resin compound can be filled with Ferritic particles which, whilst adding little to the density, permit spot magnetization in concentric tracks according to previously described digital patterns. In the result a high strength low inertia disc of small dimension is produced, capable of rotating at high speeds at high rates of acceleration requiring minimum driving power thus permitting the employment of small diameter, that is of the order of $\frac{1}{32}''$, flexible wire drives and small spring re-wind mechanism. This is the most convenient, most accurate, most reliable, and least expensive method of driving at present known.

FIGURE 14 shows the digitizer, particularly the cable drive and re-wind spring.

The cable 14a is attached by means of a capping 14b to the moving part of the system while the digitizer 14c is located on a fixed part.

The cable passes over the drive pulley 14d. Tension is maintained and the digitizer re-wound by means of the clock spring 14e which is anchored by the pin 14f at one end, and in the slot 14g in the drive shaft at the other.

The required binary pattern is generated in terms of 0=magnetic flux, 1=no magnetic flux (of .0=nonconducting, 1=conducting for a contact type digitizer).

A binary pattern, exactly as used in optical or contact digitizers is generated by the flux of arc-shaped magnets, mounted in a nonferrous disc, and magnetised through the thickness of the disc. Two or more discs can be appropriately geared together when more digits are required than can conveniently (for size, inertia or other reasons) be mounted on one disc. Each of the pickoffs used to read the flux pattern (corresponding to the brushes of a contact digitizer) consists of a small ferrite core wound with a primary and secondary winding. The primary winding, which is typically only a single turn, is excited at a high frequency, 80 kc./s. being of a suitable order. All the pickoff primaries may be connected in series to a common exciting supply, which may be of any wave form. The core is mounted so that the appropriate track of the magnet disc moves close to and immediately below it as the disc revolves.

When no magnet is below the pickoff, the core flux cycles at the primary excitation frequency, and a voltage appears at the terminals of the secondary winding. When a magnet is below the pickoff, the magnet flux holds the core saturated at one end of the flux loop, and the primary excitation is unable to cause it to cycle. Thus no voltage appears at the secondary winding. Hence the presence of a signal at the secondary winding defines binary 1, the absence defining binary 0.

The pickoff signals are then rectified, amplified and processed by V-scanning selectors, the selector outputs generating the required binary digits.

FIGURE 15 shows a magnetic disc and pickoff mounting used in the digitizer.

The disc consists of small permanent magnets 15a arranged in blocks or singly, into four rings 15b, c, d, e, and grouped to form a regular binary pattern. The magnets so arranged are fixed within a cast resin to form a disc with a central boss 15f for attaching to a shaft. The periphery of the high speed disc carries small metal segments or teeth 15g, in number many times greater than the number of least significant digit magnets. These teeth are used to generate pulses which are counted continuously in equal but adjustable successive durations of time so that a digital signal proportioned to the velocity of the moving member may be provided.

The pickoff mounting consists of a circular plate suitably bored so as to accommodate the pickoffs in holes 15h above the corresponding tracks on the disc. The plate may be rotated in its mounting and locked by means of screws and clamps 15j so that the correct relative configuration of the pickoffs before the disc may be obtained.

FIGURE 16 shows a general arrangement of the digitizer.

The unit is cable driven through puley 16a, shaft 16b and coupling 16c. Tension is maintained in the cable and the unit is re-wound in reeling-in conditions by a clock spring 16d which drives into 16b. In one form the gear box consists of five shafts 16e whose centres are arranged on the circumference of a circle. The shafts are interconnected by plain spur gearing of 4:1 reductions 16f. The high speed, medium speed and low speed shafts are extended to carry the magnetic discs 16g. Pickoffs are arranged before these discs on a mounting plate 16h which is capable of being rotated and locked so that the relative positions of the pickoffs may be adjusted.

The high speed shaft may further be extended to drive a tachogenerator 16j through flexible coupling 16k to signal speed. Alternatively this may be achieved by a further pickup controlled by teeth on the periphery of the high speed disc as described above.

This digitizer involves the following additional novel features:

The use of stationary adjustable ferrous plates mounted near the side of the magnet discs remote from the pickoffs. The position of these plates controls the reluctance of the magnet external flux paths and hence the effective field strength of the magnet. Thus the mark-space ratio of the binary pattern read by the pickoffs can be adjusted to be correct for magnets of varying strength, provided only that all the magnets in a track are matched. This adjustment is necessary to accommodate the variation of magnet quality inevitably found in commercially produced magnets.

The high frequency oscillator and the output signal rectifying circuitry are mounted in the digitizer, and therefore no high frequency power or signal transmission is involved. This permits the digitizer to be installed by normal wiring practice at up to typically 200 feet from the control equipment.

The block diagram for the complete control circuit is shown in FIGURE 10. This shows how the elements described above are combined to control the motion of a forging press and manipulator in accordance with a known method of programming. This control system can equally be programmed by other, and more complete methods of control in ways which will be quite familiar to those skilled in the arts.

The block marked OS is the control on which the original size of the forging is set up, and the block marked FS is the control on which the final size of the forging is set up. The block marked FF is the control on which the forge factor, a fraction specifying the required reduction in thickness in each pass, may be set up. The block marked SD is the control on which the position short of the final stopping position may be set up so that the press is slowed down before the final position is reached. The block marked PE is the control on which the end of a particular forging pass may be set up, and the block marked TI is the control in which each step or increment of manipulator travel is set up.

The information set up on the controls may be in decimal form, in which case decimal to binary conversion matrices will be required, as already described with reference to FIGURE 1, or it can be set up directly in binary form so as to facilitate automatic programming.

The control marked ZS establishes the point above datum from which forging thickness may be measured. It is set up as follows. The 12 lights fed from the press digitizer PD of the form described with reference to FIGURES 14–16 at all times signal the position of the moving tool in relation to a datum point, the lowest working position of the press. Adjacent to these 12 lights are 12 switches, the operation of which registers the presence or absence of the digits in a 12-digit binary number. The press is brought to the position where upper and lower tools are in contact and the lights show the height of the lower tool above datum in binary form. The operator now puts in the on-position every toggle switch whose associated light is ON. The lights that are OFF have their associated switches put in the OFF position. Hence the tool height is measured and transferred in digital form to the 12 toggle switches. This provides a simple and reliable method of correcting for tool height. It has the advantage that tool wear is corrected for every time the press is zeroed and that this information is stored mechanically and cannot be destroyed as with some types of memory device, in the event of loss of the electrical supply. If additional correction is required, such as when swaging blocks are used, this can be set up on multiposition switches without loss of memory.

After zeroing the press the ingot to be forged is placed in the jaws of the manipulator and original and final sizes, and the appropriate forging factors are set up on OS, FS and FF. The travel increment of the manipulator, i.e. the "bite" of the press, is set up on TI and the final travel position on PE. The slow down position of the press is set up on SD. First of all the manipulator hoist will position the ingot with its base on the bottom tool whilst the upper tool of the press will withdraw by an amount which will permit the forging to enter between the tools. The horizontal travel of the manipulator may be zeroed at this point in a manner similar to that already described.

In the following description it must be understood that after the information described in the preceding paragraph has been set up in digital form the apparatus proceeds to perform digital calculations to control amplifiers such as hoist raise amplifier HR whereby a forging operation for one pass is controlled. Each of the various amplifiers referred to in more detail in the subsequent description, is energised until the appropriate measured dimension coincides with the corresponding calculated dimension. Control of each amplifier is by one or more logic circuits which operate the appropriate amplifier when the necessary inputs are present and cut off the appropriate amplifier when the necessary inputs are no longer present. The logic circuits shown schematically in FIGURE 10 are described and shown in greater detail in earlier figures and on earlier pages of the specification.

In the first position the ingot will be reduced from its original size to a fraction dependent upon the forge factor. The necessary forging thickness is therefore calculated by the multiplier M1 which, in a manner previously described, provides a signal equal to the product of the original size and the forging fraction. This value is subtracted, as previously described with reference to FIGURE 3, from the original size in the subtractor S1, to give the necessary reduction. The value of this calculated reduction is used to control the lift of the manipulator hoist and the daylight of the press. The output of the subtractor S1 controls operation of the hoist raise amplifier HR through the multiplier M2, through the comparator C1 and through the trigger T2 and controls operation of the press lower amplifier PL, the press hold amplifier PH and the manipulator forward amplifier MF through comparator C4. The zero signal provided at Z by the zero signal control ZS, which indicates tool zero or the initial tool height as previously set forth with respect to the zero signal control ZS, is added to all inputs to bring them to the same datum. Thus the lowest operating point of the manipulator hoist must be such that the ingot centre line is half the pass thickness above the lower tool, the tool zero signal at Z from the zero signal control ZS being added at A5 to half the pass thickness derived from the multiplier M3 and multiplier M1. The resulting value is compared with the signal from the hoist digitizer HD at the subtractor/comparator SC2, the output of which controls the hoist lower amplifier HL. This amplifier is also controlled by a signal derived from the travel of the manipulator when that movement is complete. When the ingot centre line reaches its lowest value the hoist lower amplifier HL cuts off and downward motion discontinues. In similar fashion the hoist raise amplifier HR cuts off when the hoist reaches the upper position controlled by the multiplier M2 which transmits a signal equal to half the press daylight which, in turn, is equal to or slightly greater than the pass reduction, i.e. the difference between the pass thickness and the original size derived from the subtractor S1.

The descent of the press from the upper to the pass thickness position is monitored by the press digitizer PD. The slow down control SD, which is intended to prevent unwanted deformation arising from the impact of the press moving parts, provides a signal which is compared with the press digitizer output at the comparator C3 so that the press slow amplifier PS provides a signal to operate the slow down valve. To prevent the possibility of the press slow amplifier PS from being cut off if the difference signal from subtractor/comparator SC1 goes negative, it is arranged for the input to press return amplifier PR to take over by means of gate OR1. As the press descends to its final position the subtractor comparator SC1 provides an output which is used to operate the press return amplifier PR. It should be observed that press return amplifier PR can also be operated via the gate OR2 from the final size adder A1 and the comparator C2 if in fact the final size is greater than the original size times the forge factor. To compensate for the short but inevitable delay between operation of the press return amplifier PR and cessation of press descent a velocity correction device VC and a stretch correction device SC are used to alter the press digitizer signal by means of the adders A2 and A3. The velocity correction device VC is a standard commercial unit associated with the press which provides an output signal representative of the velocity of press movement and the stretch correction device SC, described in general terms hereinafter, is also associated with the press. It should also be noted that if the press is zeroed in a stretched condition the stretch corrector eliminates what would otherwise be a source of error.

The press raise amplifier PR actuates the hydraulic detent valve which requires merely a momentary signal to throw it into the "press raise" position where it remains, even though the actuating signal disappears, until the reverse signal throws it into the press lower position.

Accordingly the press returns to its upper position determined by the difference between the original size and the pass thickness derived from the subtractor S1 and the comparator C4 which provides a signal to operate the "press lower" amplifier PL, the "press hold" amplifier PH, and the "manipulator forward" amplifier MF. Operation of these amplifiers causes the press directional valve to shuttle into the down position, but before downward motion of the press can commence the "press hold" amplifier PH operates the valve which holds the press at its upper position until the manipulator movements are complete, when one of the two inputs to AND 3 disappears.

The upward movement of the manipulator hoist is initiated by the signal from subtractor/comparator SC1 but as this signal only persists for a short time it is made to operate the trigger T2 which once it conducts, remains conducting even though the trigger signal disappears. The hoist rises until it reaches its upper limit determined by the comparator C1, when the supply to the trigger T2 disappears. The hoist raise amplifier HR then becomes inoperative. The absence of a signal, by means of a NOT circuit, to the hoist raise amplifier HR is used to complete the signals to gate AND 2 and to operate the manipulator forward amplifier MF. The manipulator accordingly moves forward, monitored by the travel digitizer TD. The signals from travel digitizer TD are compared with the total distance traveled registered by the travel accumulator TA by comparison of the outputs of TA and TD in comparator C6. Output from comparator C6 is sustained while the travel digitizer signal is less than the travel accumulator reference. When the travel reaches the accumulator reference value output from C6 ceases. The travel accumulator TA adds and provides a total reference to the travel increments inserted at TI according to the predetermined programmed and relayed from T1 by the appearance of a signal from the press return amplifier PR, i.e. the travel accumulator TA keeping a running total of the travel increments inserted in TI. Thus each time the press returns the accumulator receives a further increment which it adds to the travel already completed for comparison with the travel digitizer output during the next forward step of the manipulator.

The disappearance of the output from comparator C6 deenergises the press hold amplifier PE and by means of a NOT circuit completes the signal to the hoist lower amplifier HL. The hoist then lowers and the press descends to start the next stroke.

The pass reference PE is compared with the travel digitizer output TD by comparator C5. When the length of the pass required is equal to the travel completed C5 provides a signal which operates the press hold amplifier PE via OR3 preventing further movement of the manipulator. The inputs for the next pass of the manipulator may then be set up either manually or automatically.

It is necessary, in order to minimise the period between the appearance of the electrical quantity signalling for reversal of the press for example and the operation of the directional valve, to provide a hydraulic impulse with minimum delay. Existing solenoid operated hydraulic valves are not capable of providing a hydraulic impulse in a short time of the order of 5 or 10 milliseconds following the electrical input signal. Furthermore, such valves require an electrical signal of great power, that is of the order of 100 watts, or are incapable of supplying a pressure impulse of sufficient power, say one cubic inch of pressure oil at 1,000 lbs., per square inch in 5 milliseconds.

A valve operated by means of a moving coil actuator, that is a device comprising either an electromagnet or permanent magnet iron circuit with a gap in which a light coil is mounted on a light former, can be made to provide a hydraulic impulse in a very short time of the order of 5 to 10 milliseconds because the inertia of moving parts is minimised and it is not necessary, as with a solenoid, to build up the magnetic flux. So far valves of this type have not been suitable for large flow oil hydraulic circuits where inter alia sealing of the spindle is accompanied by axial forces which resist rapid motion. It is proposed, therefore, to use a form of valve of this type in conjunction with the aforementioned control elements to obtain rapid operation of the directional and other valves, and consequently rapidity of response and accuracy of control.

FIGURE 17 shows the construction of the moving coil operated rapid acting valve. A ring type permanent magnet 17h is assembled with soft steel pole pieces 17a and 17j in the gap of which a coil 17a wound on an aluminum, or preferably a nonmetallic former 17c is located. The coil is connected to the end of the valve spindle 17d. The manufacturing tolerances of the spindle, coil, and housing 17b are such that a very small clearance of the order of .002" can be maintained between the coil and the sides of the gap. With valves employed in systems of this kind it is necessary for exhaust lines to sustain pressures of 100 p.s.i. or more. Permanent magnet alloys are so brittle as to be unsuitable for containing high pressures, particularly of a rapidly changing character. The gap between the pole pieces 17a and 17j are therefore sealed by means of a nonferrous ring 17k which carries rubber joint rings in suitable slots. Surrounding the magnet is a nonferrous cover 17m.

The electric supply to the coil windings is conveyed by means of flexible conductors 17g which carry short rubber sleeves at the plug end only, so as to prevent concentration of flexure at this point. The plug 17e is capable of withstanding the maximum exhaust pressure. One advantage of the use of this type of valve is that motion in an opposing direction can be contrived by reversing the direction of current supplied to the coil. Thus although cessation of current permits return of the valve spindle 17d to its neutral position, reversal of the current signal will result in accelerated motion of the spindle across neutral to the other end of travel. A known form of spring and washer assembly 17f controls the centralising motion.

FIGURE 11 shows how a pair of these valves 11b used in combination in such a way that should either valve fail to operate, over penetration, which could completely spoil an expensive forging, cannot take place. Accordingly the pressure supply to operate the directional valve 11a is fed in parallel from both valves so that operation of one valve alone is sufficient to reverse the press. On the other hand, seeing that with one valve jammed in the exhaust position the pressure signal from the other would not be able to operate the directional valve, it has been arranged for the exhaust paths to be connected in series. In this condition the press could not be stopped from returning but the forging would not be spoiled thereby, nor would the press be damaged. Closure of valve 11c can permit the continuation of working with one valve should the other be ineffective.

In controlling machines of the aforementioned types, the price of failure of any control element is high in terms of material and sometimes in terms of life. To safeguard such high risk control systems it is proposed to duplicate the control systems and in novel manner continuously to compare the error signals of each pair. These error signals should be at all times the same or very nearly the same. If they differ, the fact of faulty operation may be shown.

By this means also warning may be given of conditions of abnormal straining of machine parts. In a forging press, for example, the two digitizers may be mounted at each side of the press. If the press deforms asymmetrically the difference between the two error signals provides a measure of that deformation.

If the forging is off centre there is a danger of excessive tilt of the press occurring and this must be held to certain limits. Since the digitizer and control system are duplicated, a measure of tilt can be obtained by taking the difference between the two digitizer outputs.

A complication arises due to the fact that the tilt may be to either side of the press, but this can be overcome in the manner described with reference to FIGURES 3 or 12.

The carry from a normal subtractor described with reference to FIGURE 12 may be utilised to correct the system as shown in FIGURE 13, which shows a subtractor/comparator circuit for one binary digit, there being a number of such subtractor/comparators for the complete tilt indicator.

The blocks TA and TB are trigger circuits with one input and two output (being signal and complement).

When the input is 0 the outputs are as shown, and when the input is 1 the outputs change over and remain in this state until the input is again 0. The block FF is a flip flop and has two inputs and the two outputs as shown. If the inputs are strapped together as shown in FIGURE 13 then a signal will cause the outputs to change over. The flip flop will stay in this state when the input is removed and will only change when another input is applied.

The circuit operation is as follows:

$A>B$.—Under these conditions the flip-flop FF is in the condition shown so that AND gates 2 and 3 are operative while AND gates 1 and 4 are inoperative. Therefore, the complement of A is connected to the adder via gate AND 2 and OR gate 5 and the signal of B is connected via gate AND 3 and OR gate 6. Hence the circuit operates in a similar manner to that given in FIGURE 12. Because $A>B$, AND gates 2 and 3 in fact have no output and, since AND gates 1 and 4 are inoperative, nothing is entered into the adder.

$B>A$.—In this case if the flip flop is initially in the state as shown in FIGURE 13 then A being 0 will produce an input from AND gate 2, B being 1 will produce an output from AND gate 3, the adder will receive two inputs and a carry will be generated and this will cause the flip flop to change over. Therefore AND gates 2 and 3 become inoperative and AND gates 1 and 4 become operative. The complement of B will therefore now be connected to the adder via AND 4 and the signal A will be connected via AND 1. Thus the system has corrected itself. The outputs from the adder shown in FIGURE 13 may be used in several ways to give an indication that the press is being strained. For example suppose the maximum tilt permissible corresponds to a difference between digitizers of ½" then if the last four least significant digits corresponding to $\frac{1}{32}$", $\frac{1}{16}$", $\frac{1}{8}$" and $\frac{1}{4}$" are fed into an AND circuit, (not shown), an output will occur when the difference is $\frac{15}{32}$" and this could be used to give visible and/or audible warning that the limit is being approached.

If the operator ignored this warning and the difference increased to ½" the fifth digit would be energised and this could be used to reduce the pressure or return the press.

A further use for this tilt is to check that the two digitizers are operating correctly before the start of the forging stroke. This can be achieved as follows:

At the end of the return stroke the press will dwell for a given time. During this period there will be no strain on the press and hence the outputs from the two digitizers should be equal. By feeding the outputs from the adder via a 12 input OR circuit to one leg of an AND and feeding the other leg from the timer signal, any error between the two digitizers can be detected.

The press stretch correction device denoted SC in FIGURE 10 may take several forms. In one form a standard damped pressure gauge is equipped with a disc of the type shown in FIGURE 15 in place of the pointer. When connected to the main cylinder a digital signal proportional to main pressure and therefore to press stretch is generated. This signal is used as described above.

We claim:

1. Apparatus for automatically controlling the operation of a forging press and manipulator according to programmed information concerning initial and final sizes of the forging and the permissible forging factor, comprising in combination first means wherein the programmed information may be inserted on a digital basis for providing outputs representative thereof, second means wherein information specifying increments of movement and total movement to be imparted to said manipulator may be inserted on a digital basis for providing outputs representative thereof, a manipulator hoist associated with said manipulator, and third means responsive to the outputs of said first and second means for combining the outputs thereof in a desired manner and for controlling the movement of said manipulator hoist and the forging press.

2. The apparatus as recited in claim 1 wherein a press digitizer including a plurality of lamps is provided which provides an output indicative of the position of the press above a reference datum position from which forging thicknesses are measured.

3. The apparatus as recited in claim 1 wherein means are provided for measuring the actual movement of said component parts, the actual movement of at least one component part being measured on a digital basis by means including at least one digital disc and a set of pickoff devices, said pickoff devices being mounted in a plate which can be rotatably adjusted and then locked in the adjusted position so that the correct relative configuration of the pickoff devices and the disc may be maintained.

4. The apparatus as recited in claim 1 wherein means are provided for measuring the actual movement of said component parts, the movement of at least one component part being measured on a digital basis by means including a set of digital discs, each disc carrying a plurality of concentric rings of magnets and each ring corresponding to a different denomination of a binary code, each ring except that corresponding to the least significant binary denomination being associated with a pair of pickoff devices which are spaced apart and which feed a logic circuit whereby conversion of movement of said component part to digital form is effected unambiguously.

5. The apparatus as recited in claim 1 wherein means are provided for measuring the actual movement of said component parts, the movement of component parts which are intended to be equal being measured on a digital basis, means for comparing the digital measurements of components parts to be moved equally and for providing an output when the digital measurements differ more than a predetermined amount, and means for providing an alarm signal when an output is provided by said comparing and output producing means.

6. The apparatus as recited in claim 1 wherein a press digitizer including a set of lamps and a set of electric switches corresponding to the set of lamps is provided for indicating on a digital basis the position of the press above a reference datum position, the switches being operable to control the associated lamps and to alter the reference datum position from which the position of the press is measured.

7. The apparatus as recited in claim 6 wherein a hoist digitizer is provided which indicates on a digital basis the position of the hoist above a reference datum position.

8. The apparatus as recited in claim 1 wherein means are provided for measuring the actual movements of said component parts, the actual movement of at least one of said component parts being measured by means including a digital disc of light weight nonmagnetic material to which are secured magnets arranged in concentric rings, the disc being rotated by movement of said associated component part and thereby effecting a magnetic sensitive circuit to produce pulses representative of the movement of said component part.

9. The apparatus as recited in claim 8 wherein the digital disc is of a high strength resin compound and the magnets are curved and embedded in the disc.

10. The apparatus as recited in claim 8 wherein the digital disc is of a high strength resin compound filled with ferritic particles and the magnets are produced by spot magnetization.

11. The apparatus as recited in claim 1 wherein means are provided for measuring the actual movement of said component parts, the actual movement of at least one of said component parts being measured by means including a plurality of digital discs geared together so as to be driven at different speeds, each disc comprising a set of concentric rings of magnets, each ring of magnet being arranged according to a different denomination of a binary code, the low speed discs being utilized to indicate movement of said component part according to the higher denominations of the binary scale and the high speed discs being used to indicate the movement according to the lower denominations of the binary scale.

12. The apparatus as recited in claim 11 wherein a pickoff device is associated with each of the concentric rings on a disc, each pickoff device including a small ferrite core with a primary and a secondary winding, the primary winding being excited at high frequency, the arrangement being such that when no magnet is adjacent the pickoff device a voltage appears across the terminals of the secondary winding and when a magnet is adjacent the pickoff device no voltage appears across the secondary winding.

13. The apparatus as recited in claim 11 wherein the digital discs are of such low inertia as to permit the employment of a spring and cable rewind device.

14. The apparatus as recited in claim 11 wherein the digital disc which is driven at the highest speed carries on its periphery small metal segments, greater in number than the number of magnets corresponding to the least significant digit.

15. The apparatus as recited in claim 14 wherein said metal segments are utilized to generate pulses which are counted continuously in equal but adjustable successive durations of time so as to provide a digital signal representing the velocity of said component part.

16. The apparatus as recited in claim 15 wherein a ferrous plate is mounted adjacent the digital disc in adjustable manner whereby the effective field strength of the magnets may be adjusted.

17. Apparatus for automatically controlling the position of a component part of an industrial machine such as a forging press and manipulator according to a prescribed program of information specifying for example, the reduction of a forging at each pass, comprising in combination
 (a) means for providing an analog output representative of the position of the machine component part to be controlled,
 (b) a digitizer for converting the analog output into digital form, said digitizer including
  (1) a saturable inductor fed by a potential source,
  (2) a magnet spaced from said inductor at a distance from which said magnet normally saturates said inductor,
  (3) a digital shunt having a plurality of spaced apart magnetic elements distributed in accordance with a denomination of a binary code,
  (4) means for moving the magnetic elements of said digital shunt, in accordance with the position of said machine component part, along a path between said magnet and said inductor so as to alternately permit saturation and cause desaturation of said inductor as said machine component part is translated, and
  (5) output circuit means responsive to the condition of said inductor for producing a signal of a first level when said inductor is saturated and of a second level when said inductor is desaturated, and
 (c) computational means for combining the outputs of said program of information and said digitizer and for deriving from said combined outputs a signal indicative of the amount of movement to be imparted to the component part of the machine to be controlled.

18. Apparatus for automatically controlling the operation of an industrial machine such as for controlling the movement of a forging press and manipulator according to a prescribed program of information specifying, for example, the reduction of a forging at each pass, comprising in combination first means wherein the programmed information may be inserted on a digital basis for providing outputs representative thereof, computational means for combining the outputs of the first means in a desired manner and providing outputs indicative of amounts of movements to be imparted to the component parts of the machine to be controlled, amplifier means responsive to the output of said computational means for effecting movements of the forging press and manipulator until their actual positions coincide with the positions computed from the programmed information, said amplifier means including electric and hydraulic means whereby said component parts are moved under the influence of hydraulic pressure controlled by a rapid acting hydraulic valve with an electric moving coil actuator, said hydraulic valve further including a spindle movable longitudinally to control the supply of pressure fluid, said spindle supporting a light weight moving coil on a light weight former for movement in the gap of a ring type permanent magnet.

References Cited by the Examiner

UNITED STATES PATENTS

| | | | |
|---|---|---|---|
| 2,073,812 | 3/1937 | Severy | 200—19 |
| 2,823,345 | 2/1958 | Ragland | 318—20.310 |
| 2,827,531 | 3/1958 | O'Brien | 200—19 |
| 2,833,941 | 5/1958 | Rosenberg | 307—149 |
| 2,909,717 | 10/1959 | Hulls | 318—20.310 |
| 3,016,778 | 1/1962 | Fitzner | 74—365 |
| 3,036,598 | 5/1962 | Smith | 137—623 |
| 3,099,873 | 8/1963 | Brainard | 29—568 |

FOREIGN PATENTS 538,409    8/1941    Great Britain.

CHARLES W. LANHAM, *Primary Examiner.*

RICHARD H. EANES, *Examiner.*

G. P. CROSBY, *Assistant Examiner.*